Dec. 1, 1964    P. F. OLTON ETAL    3,159,083
AUTOMATIC CONTROL MECHANISM FOR A MACHINE TOOL
Filed Sept. 26, 1962    6 Sheets-Sheet 1

Dec. 1, 1964 — P. F. OLTON ETAL — 3,159,083
AUTOMATIC CONTROL MECHANISM FOR A MACHINE TOOL
Filed Sept. 26, 1962 — 6 Sheets-Sheet 5

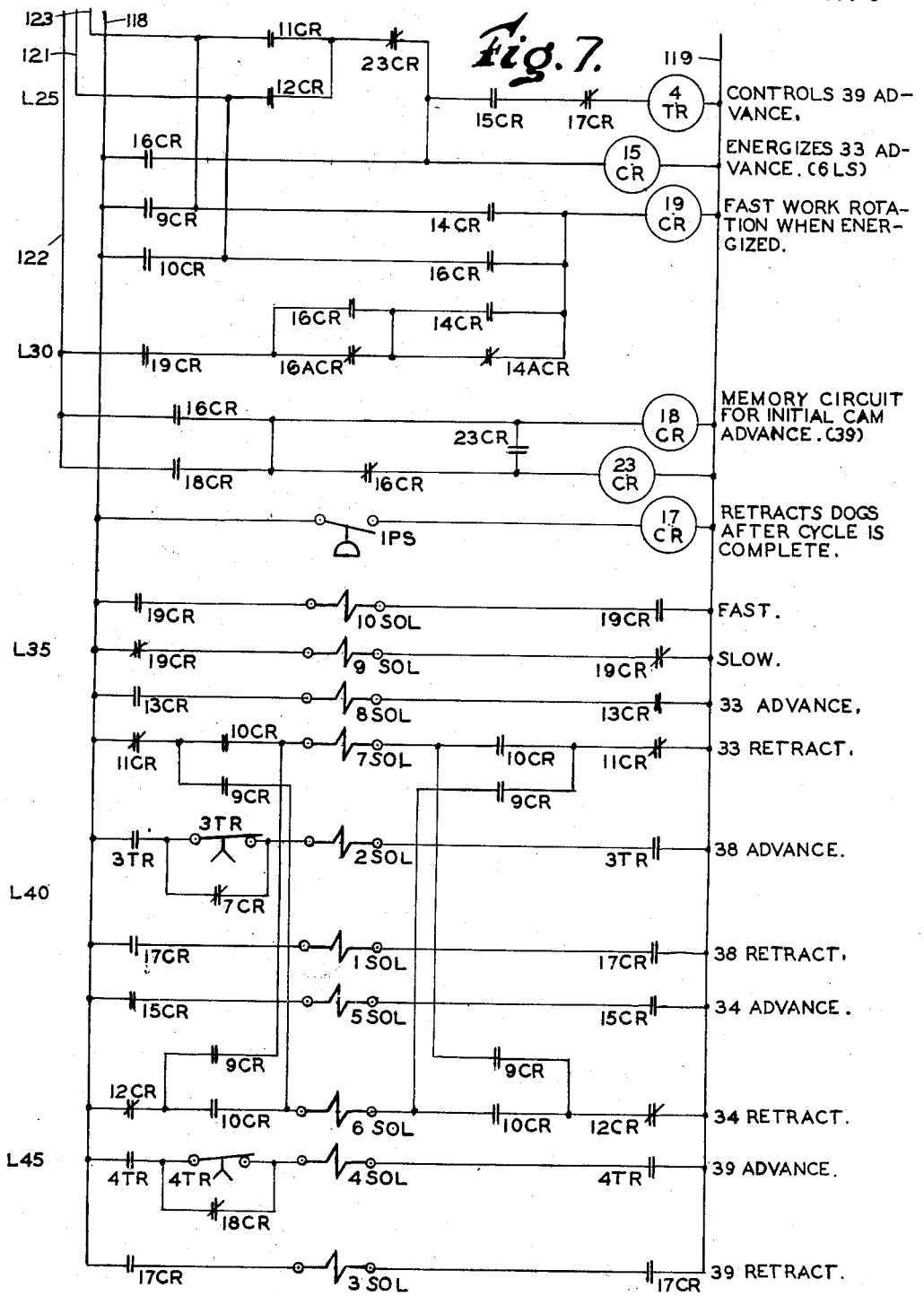

United States Patent Office 3,159,083
Patented Dec. 1, 1964

3,159,083
AUTOMATIC CONTROL MECHANISM FOR
A MACHINE TOOL
Peter F. Olton and Merrill E. Berchtold, Cincinnati, Ohio, assignors to The Cincinnati Milling Machine Co., Cincinnati, Ohio, a corporation of Ohio
Filed Sept. 26, 1962, Ser. No. 226,412
12 Claims. (Cl. 90—13.4)

This invention relates to an automatic control mechanism for a machine tool and more particularly to a control mechanism useful in the automatic control of a machine tool for producing a member having an irregular contour, for example, a steam turbine blade.

One method of machining steam turbine blades is to relatively move a rotating milling cutter around the turbine blade with the cutter's periphery in contact with the blade. At the same time, the milling cutter is slowly moved along the length of the blade. In such an operation, the blade usually is rotated on one axis while that axis is shifted in a reciprocating fashion along another transverse axis while the milling cutter is moved progressively along the length of the blade to produce the proper blade contour. The feed speed of the operation, that is the velocity of the cutting tool over the blade surface, is determined by the angular velocity of the turbine blade. As the milling cutter is caused to move over the area of the blade face near the leading and trailing edges and over the convex back of the blade, there is a rather small area of contact between the blade and the cutter since each curves away from the other. A rather high feed speed can be tolerated at this time without producing the adverse effects of excessive machining forces and chatter during the operation. However, when the cutter is in contact with the concave face or bucket of the blade, a rather long arc and enlarged area of contact between the cutter and turbine blade occurs due to the curvature of the blade around the milling cutter. This enlarged area of contact will cause a great amount of chatter which results in short cutter life and inferior blades unless the feed speed is substantially reduced from that speed which is the optimum for the rest of the blade surface.

As long as straight turbine blades having straight line leading and trailing edges are machined, the feed speed can be conveniently controlled in accordance with the angular position of the blade as it is rotated relative to the cutting tool. However, turbine blades frequently have a twisted shape and the leading and trailing edges of these blades form irregularly curved lines. In order to provide a reference for controlling the feed speed in the most efficient manner by slowing it only while the cutter is in the blade bucket, it is necessary to keep track of the change in location of the blade edges as the cutting tool is moved along the turbine blade.

It is therefore an object of this invention to provide a memory mechanism which will record extremes in movement of a reciprocally movable slide during a cycle of operation.

It is a further object of this invention to provide a control mechanism which is operable to regulate the rate of movement of one member in accordance with predetermined positions of another simultaneously movable member, the predetermined positions changing location only slightly from cycle to cycle of operation but having an appreciable cumulative change for a number of cycles.

It is also an object of this invention to provide a control mechanism capable of automatically regulating the feed speed of a turbine blade milling machine in accordance with the contour of a twisted turbine blade.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention includes a mechanism that records the points at which a reciprocally movable slide is reversed and the mechanism retains this information for subsequent use. The information is used to produce signals which in turn control the rate of movement of another slide member or carriage movable along another axis simultaneously as the reciprocating slide is moved. After the information is used, it is cleared from the mechanism which is then reset to record a new position of slide reversal. The mechanism includes a record member that is selectively movable with the reciprocating slide in one direction only. Thus the record member can be carried with the reciprocating slide to a point of reversal or an extreme of slide movement where it remains. A cam is included as a part of the record member and is adapted for engagement by a signal mechanism carried by the reciprocating slide. The position of the cam along the record member can be adjusted for operation of the signal mechanism at a preset distance away from a point of reversal. Control elements are responsive to the signal mechanism and these cause the rate of movement of the carriage member to be altered in accordance with the position of the reciprocating slide relative to a recorded position. A clearing mechanism is also included and is selectively operable to move the record member in the direction opposite to that in which it is carried by the reciprocating slide after the information represented by the position of the record member is used.

A clear understanding of the construction and operation of this invention can be obtained from the following detailed description in which reference is made to the attached drawings in which:

FIGS. 6 and 7 are a schematic electrical control circuit for the machine.

Figure 1:
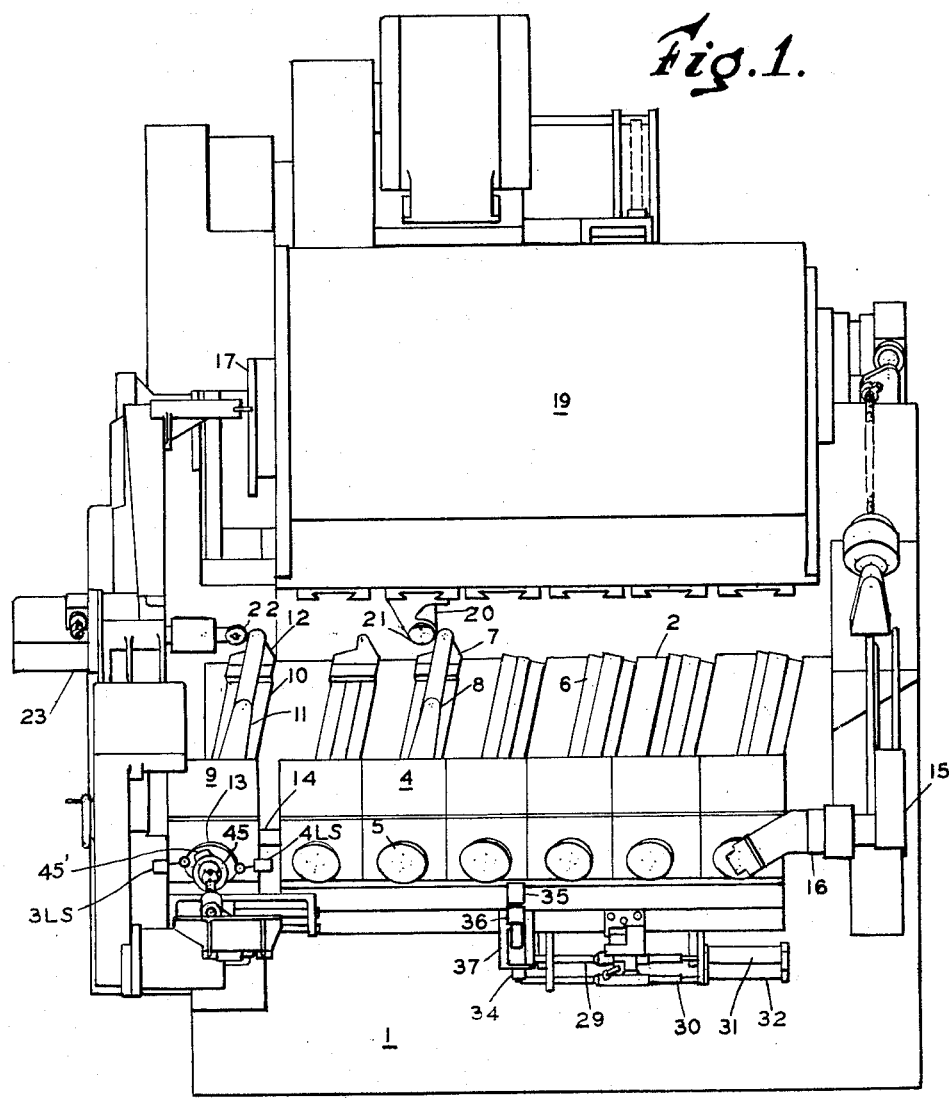
FIG. 1 is a front elevation of a turbine blade milling machine.
Figure 5:
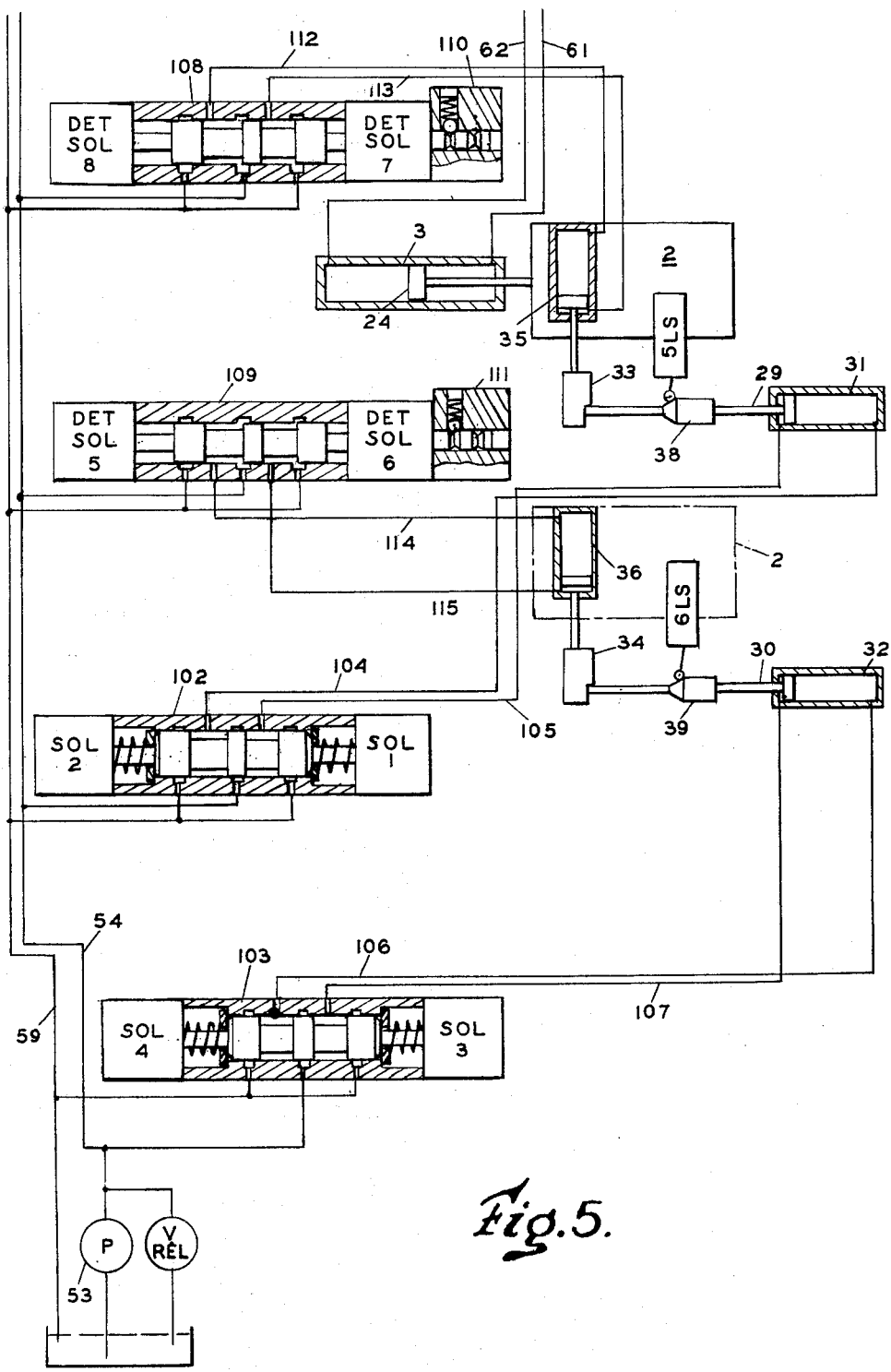

As shown in the specific example described herein, a turbine blade milling machine, FIG. 1, of the type that produces a copy by tracing a master pattern is built on a base 1. A table 2 is supported on an inclined top surface of the base 1 and is laterally movable thereon by the reciprocation of a piston and cylinder motor 3 (FIG. 5). The top of the base 1 slopes upward from the front to the rear at an angle of approximately 30 degrees and the table 2 is similarly inclined as a result thereof to ascend front to rear at the same angle. The table 2 supports a set of workheads 4, each of which has a blade fixture 5 rotatably supported therein. The table 2 also has a set of parallel dovetail ways 6 thereon and each of these has a male center 7 secured thereto. The centers 7 and blade fixtures 5 are adapted to hold workpieces 8 therebetween during a milling operation. Another workhead 9 is included on the table 2 along with an additional dovetail way 10 parallel to the ways 6. A master blade 11 is received between a male center 12 on the way 10 and a fixture 13 which is rotatably supported in the workhead 9. All of the fixtures 5 and 13 are drivingly connected to a shaft 14 for rotation in unison. The shaft 14 extends through the workheads 4 to a transmission mechanism 15 that is driven by a hydraulic motor 16 which is supported on a corner of the table 2. Therefore, the master blade 11 and workpieces 8 are rotated together on parallel axes which are inclined rearwardly parallel to the top of the table 2 but which are slightly oblique relative to a direction perpendicular to the direction in which the table 2 reciprocates.

A saddle member 17 also is supported on the inclined top surface of the base 1 above the table 2. The saddle 17 is movable laterally on the base 1 a small amount by operation of a piston and cylinder motor 18 (FIG. 4) which is drivingly connected thereto, this movement being for the correction of tracing errors only. The saddle 17 supports a spindle carrier 19 in a cantilever manner over the table 2. The spindle carrier 19 is movable in an inclined direction parallel to the top of the table 2 and transverse to the direction of movement thereof by operation of a piston and cylinder ram. Since the motor which moves the spindle carrier 19 downward can be of any type well known in the machine tool art which will produce a slow and continuous movement of the spindle carrier 19, it is not shown or described in detail herein. A set of spindles 20 are supported in a depending fashion under the spindle carrier 19 and each of these is adapted to hold and rotate a milling cutter 21. These milling cutters 21 are designed to cut on their peripheries. As the spindle carrier 19 is moved downward, the cutters 21 are carried into contact with the workpieces 8 and will machine the surface of these workpieces as they are rotated by the blade fixtures 5.

The contour which is produced on the workpieces 8 as the cutters 21 are moved therealong depends upon the movement of the table 2 simultaneously with the workpiece rotation and cutter feed movement. Reciprocation of the table 2 moves the axis of rotation of the workpieces 8 transversely relative to the cutters 21. To control the table movement, the master blade 11 is engaged by a follower roller 22 having approximately the same diameter as the cutters 21. The follower roller 22 is carried by a hydraulic tracing mechanism 23 which controls the supply of fluid under pressure to the table motor 3 (FIG. 5). The piston 24 in the motor 3 is operatively connected to move the table 2 in accordance with the fluid pressure differential in the motor 3. The operation of the tracing mechanism 23 is conventional and such that the table 2 is caused to move to maintain the roller 22 in contact with the master blade 11 with a predetermined force. Therefore as the master blade 11 is rotated, the table 2 will shift laterally in accordance with the blade contour at the instantaneous axial location of the roller 22 thereon. The roller 22 and cutters 21 progress downward along the master blade 11 and workpieces 8, respectively, in unison. Therefore, the shape of the master blade 11 will be reproduced on the workpieces 8.

Figure 3:
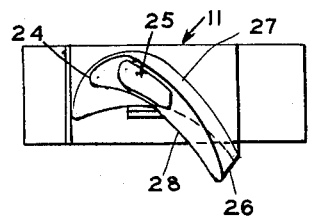
FIG. 3 is an end view of a turbine blade.

A typical turbine blade is shown in FIG. 3 which is an end view of a master blade, such as the blade 11, having a twisted shape and the figure reveals generally the cross sectional shape or profile of the blade. It can be seen that the leading edge 24 changes its angular position around the axis 25 on which the blade 11 is rotated when on the described machine. In a similar manner, the trailing edge 26 changes its angular position around the axis 25 as it progresses along the blade 11 due to the twisted shape. Therefore, as the blade 11 is rotated, the edges 24 and 26 will not be moved past the tracer roller 22 (FIG. 1) at the same angular position of the fixture 13 from one cycle to the next. The revolution to revolution change is slight, but the cumulative change from end to end of the blade 11 is appreciable. As the blade 11 is rotated to cause the convex back surface 27 to be produced on the workpieces 8, the cutters 21 will have a small area of contact with the workpieces 8 and the fixtures 5 may be rotated to produce a rather rapid feed rate without creating a chatter cutting condition. The same is true for the face area of the blade 11 that lies along the leading and trailing edges 24 and 26. However, when the cutters 21 are producing the concave face area 28, each of the workpieces 8 in effect is wrapped around one of the cutters 21 and there is a large area of contact therebetween which tends to cause high machining forces and vibration or chatter in the workpieces 8. The feed rate must then be reduced by slowing the rotation of the fixtures 5.

To keep the machining process at its most efficient level, the points at which the blade 11 and workpieces 8 are slowed and accelerated should change in accordance with the twist of the blade 11. As each of the edges 24, 26 is moved past the cutters 21, the table 2 will reverse its direction of travel since it will be in an extreme position in one direction for that portion of the blade surface. That is to say, the leading and trailing edges 24, 26 are at the greatest distance on either side of the axis 25 for any particular cross section of the blade 11. There will be two extreme positions in the one direction, one for the leading edge 24 and one for the trailing edge 26. By recording these extremes in table movement and using the information represented by them, signals may be produced therefrom for controlling the rate of operation of the motor 16 that rotates the fixtures 5 and 13.

Figure 2:
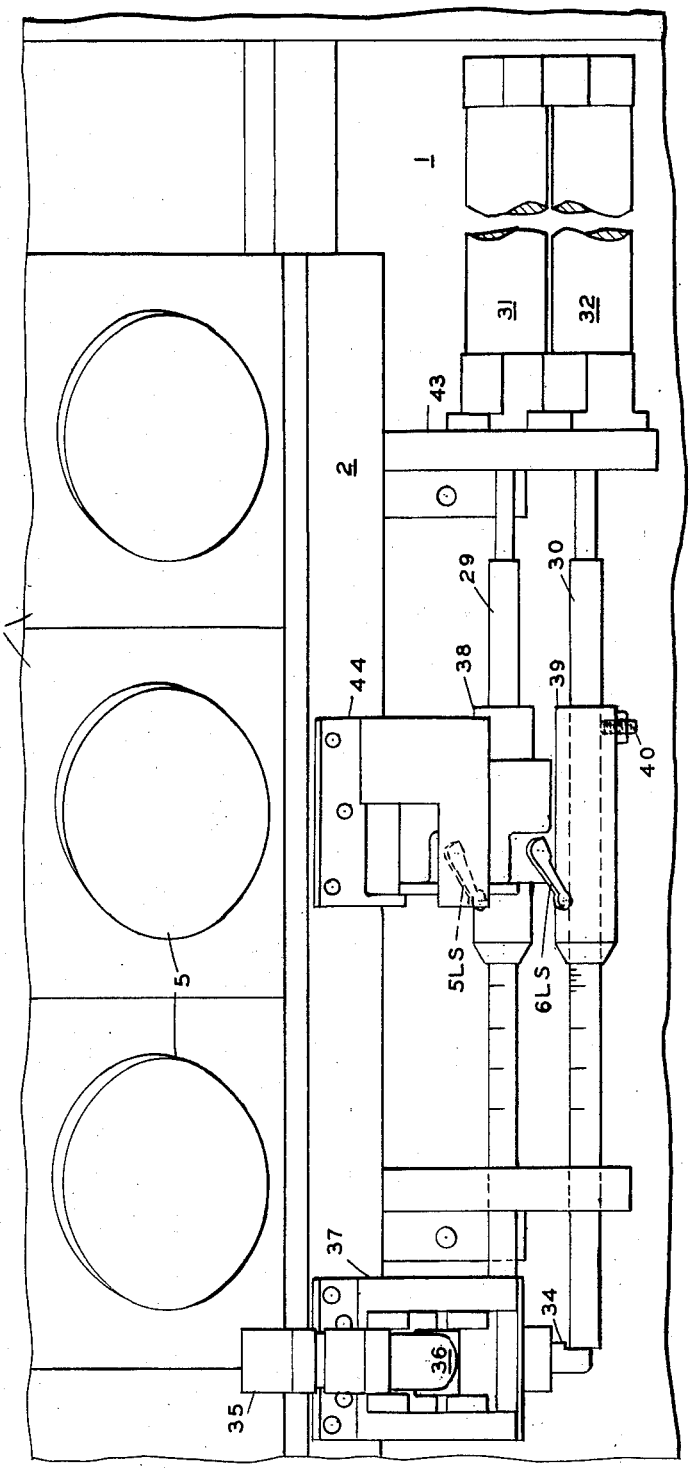
FIG. 2 is an enlarged view of a portion of the machine of FIG. 1.

The information storage members in the example shown are a pair of piston rods 29, 30, FIGS. 1 and 2, which may be moved to the left only by the motors 31, 32, respectively, during a machining operation. The motors 31 and 32 are fixed to a bracket 43 that extends from the front of the base 1 below the workheads 4 that are attached at the front edge of the worktable 2. A pair of stops 33 and 34 (stop 33 shown in FIG. 5) extend outwardly and downwardly to be transverse to the rods 29 and 30. The stops 33, 34 are held by a pair of piston and cylinder motors 35 and 36, respectively, that are fixed to the front of the table 2 by a bracket 37. When extended from the motors 35 and 36, the stops 33 and 34 are adapted to engage ends of the rods 29 and 30, respectively. When retracted by reverse operation of the motors 35 and 36, the stops 33 and 34 will not engage the rods 29 and 30. During a machining operation, the cutters 21 are on the left side of the rotating workpieces 8 (as viewed in FIG. 1) and therefore the table 2 will move to the right as the leading and trailing edges 24 and 26 are swung past the cutters 21. To prepare one of the rods 29 or 30, for example the rod 29, for recording an edge position, the motor 31 is momentarily energized while the stop 33 is extended. This causes the rod 29 to shift to the left (as seen in FIGS. 1 and 2) where it engages the stop 33. The rod 29 may now be positioned to record edge position information. The table 2 moves to the right and the rod 29 is carried along by the stop 33 which remains extended. One of the blade edges 24 or 26 swings past the tracer roller 22 and the tracing mechanism 23 then reverses the direction of table travel. As the table 2 moves back to the left, the stop 33 moves away from the rod 29 which is left in a position representing the table position that corresponds to the angular fixture position when a blade edge has passed the roller 22 and cutters 21. Thus the rod 29 may be used to record the table position and furnish leading edge information while the other rod 30 is similarly positioned to yield trailing edge information.

To produce the control signals from the information represented by the positions of the rods 29 and 30, a cam 38 and 39 is attached to each of the rods 29 and 30, respectively, to form a part of the recording members and each is adjustably positionable therealong and locked in place by a set screw 40. A pair of limit switches 5LS and 6LS is fixed on a bracket 44 that extends outward and downward from the front of the table 2 below the workheads 4. These limit switches 5LS and 6LS are adapted to be operated by the cams 38 and 39, respectively, as the table 2 is reciprocated. Since the cams 38 and 39 are positionable along the rods 29 and 30, they may be set to operate the limit switches 5LS and 6LS each time the table 2 has moved a predetermined distance away from the table positions represented by the positions to which the rods 29 and 30 are moved. Thus signals are available for controlling the rate of operation of the fixture motor 16, and these may be adjusted by selected positioning of the cams 38, 39 to occur when the cutters 21 start machining in the concave area of the blade face 28 and as the cutters 21 leave the concave area.

In order that the control signals from the limit switches 5LS and 6LS are used at the proper time during each cycle of the fixtures 5 and 13, a cam 45 (FIG. 1) is attached to the master fixture 13 and is rotated therewith. The cam 45 has a lobe 45′ thereon adapted to operate two limit switches 3LS and 4LS as the cam 45 is rotated with the fixture 13. One limit switch, 3LS, is operated during the time when the roller 22 is in contact with the convex blade surface 27 while the other limit switch, 4LS, is operated during the time when the roller 22 is in contact with the convex face 28. Since the blade twist is normally less than a quarter of a turn, the concave and convex signals can be caused by the cam shape and location of the limit switches 3LS and 4LS with respect thereto to occur near the center area of these surfaces during rotation of the master 11 and work 8 while the roller 22 is in contact about midway along the length of the blade and they will be useful over the full range of the movement of the roller 22 along the blade 11.

Figure 4:
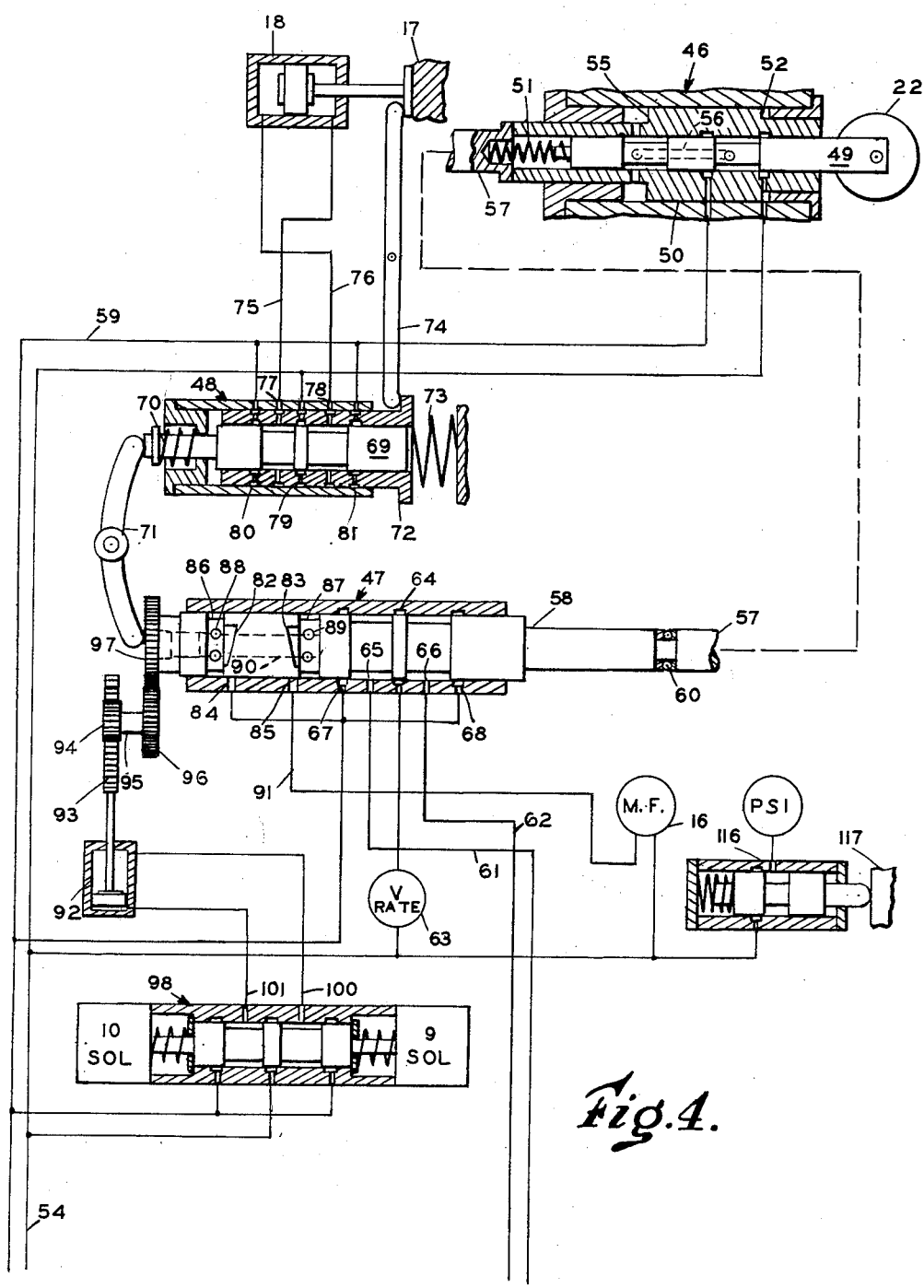
FIGS. 4 and 5 are a schematic hydraulic control diagram for the machine.

The hydraulic operating circuit for the machine table and memory mechanism is shown schematically in FIGS. 4 and 5. The tracer valve unit 23 (FIG. 1) is made up of three valve units 46, 47, and 48 which are mechanically linked together for operation. The valve 46 is a pilot valve, the plunger 49 of which carries the roller 22 that engages the master pattern blade 11. The plunger 49 is urged rightward relative to a movable sleeve 50 by a spring 51. The sleeve 50 has a forward piston area 52 to which fluid under pressure can be supplied from a source of pressure 53 (FIG. 5) through a main pressure line 54. The supply of fluid under pressure to the piston area 52 results in a force acting leftward on the sleeve 50 at all times since the fluid under pressure is supplied directly thereto. A rear piston area 55 on the sleeve 50 is larger than the forward area 52 but it is not constantly in full communication with the pressure line 54. In the position shown, the area 55 is not fully connected through the interdrilled passage 56 to the main pressure line 54 and therefore the net hydraulic forces on the valve sleeve 50 tend to produce movement of the sleeve 50 to the left. The sleeve 50 is fixed to the end of a connecting rod 57 which extends from a plunger 58 in the tracer valve 47. The plunger 58 is biased to move toward the sleeve 50 in the pilot valve 46 by means of a mechanism to be described subsequently. This bias on the tracer valve plunger 58 resists the force produced on the forward piston area 52 and causes the sleeve 50 to tend to move to the right against the force at the forward area 52. With the roller 22 maintained in a fixed position, the sleeve 50 and plunger 49 will assume the position shown with the rear area 55 cut off from the main return line 59 which is connected to the pilot valve 46. There will be a slight leakage from the pressure line 54 through passage 56 to the rear area 55. This slight leakage connection will produce a force equivalent to the difference between the forward area force and the force from the tracer valve plunger 58 to hold the sleeve 50 in an equilibrium position relative to the plunger 49.

In operation, the position of the roller 22 and the plunger 49 is determined by its engagement with the master blade 11. When the master blade contour allows the plunger 49 to be moved to the right by the spring 51, the rear piston area 55 of the sleeve 50 is connected more fully to the main pressure line 54 and since the rear area 55 is larger than the forward area 52, the sleeve 50 will follow the plunger 49 until the same relative equilibrium position between the two is reached. When the master blade contour changes to force the plunger 49 in the other direction against the spring 51, the rear piston area 55 is connected directly to the main return line 59 and the force at the forward area 52 will shift the sleeve 50 in the same direction against the tracer valve plunger bias until again the same relative equilibrium position is achieved. Thus the sleeve 50 is caused to follow the movement of the plunger 49, the position of which is determined by the contour of the master blade 11 (FIG. 1) as it rotates relative to the tracing mechanism 23.

The position of the sleeve 50 in the pilot valve 46 determines the axial position of the plunger 58 in the tracer valve 47. The connecting rod 57 extends from the sleeve 50 loosely into a counter bore (not indicated) in the plunger 58. A thrust bearing 60 is received between the plunger 58 and the rod 57 to transmit the axial forces therebetween. When the sleeve 50 is shifted to the left, the tracer valve plunger 58 is forced to the left against the bias force produced thereon. When the sleeve 50 is allowed to move to the right, the tracer plunger 58 is caused to follow that movement.

The axial position of the plunger 58 determines the fluid pressure differential in a pair of motor operating lines 61 and 62 which communicate with the opposite ends of the piston and cylinder motor 3, FIG. 5, that shifts the machine table 2 laterally. Fluid under pressure is connected through a rate valve 63 to the port 64 which is between the operating line ports 65 and 66. The main return line 59 is connected to ports 67 and 68. With the plunger 58 in the position shown, the pressure and return ports 64, 67 and 68 are blocked and the motor 3 is static. It can be seen that as the plunger 58 shifts rightward with the sleeve 50, the pressure port 64 is in communication with port 65 and fluid is supplied to the right end of the motor 3 while its left end is connected to the return port 68. Thus the table 2 is moved leftward as viewed in FIG. 1, to carry the master blade 11 toward the tracing mechanism 23. Similarly, when the plunger 58 is forced leftward, the table 2 will be moved toward the right, as viewed in FIG. 1, to carry the master blade away from the tracing mechanism. In this manner, the axial deflection of the sleeve 50 in the pilot valve 46 and the plunger 58 in the tracer valve 47 is maintained in a close relationship to the position shown in the drawings, FIG. 4 and the relative movement of the workpieces 8 and the cutting tools 21 will reproduce the contour of the master blade 11.

In order that the machine table 2 be in motion, there is required to be a slight axial displacement of the plunger 58 from the position shown in the tracer valve 47. In addition there is a slight lag in response of the machine parts. These factors tend to produce a slight departure in the contour of the workpieces 8 from that of the master blade 11. Therefore a compensation valve 48 is added to the tracer valve system. The valve 48 has a plunger 69 which is biased to shift leftward, as shown in FIG. 4, by a spring 70. The movement of the plunger 69 is stopped by a pivotal lever 71 which engages both the compensation valve plunger 69 and the tracer valve plunger 58. This mechanical arrangement furnishes the described bias which tends to move the tracer valve plunger 58 rightward. The compensation valve 48 also has an axially movable sleeve 72 which is independently biased to move to the left by a spring 73. The movement of the sleeve 72 is resisted by a pivotal lever 74 which engages a shoulder on the sleeve 72 and the side of the saddle 17.

The compensation valve 48 acts as a tracer valve to create a fluid pressure differential in the piston and cylinder motor 18 that is operatively connected to produce a lateral shift of the saddle 17. The valve 48 is connected to the motor 18 by operating lines 75 and 76 which are each connected to the valve 48 at ports 77 and 78, respectively, and are each located between a pressure port 79 and one of the return ports 80 and 81. As the tracer valve plunger 58 is allowed to shift to the right, the compensation valve plunger 69 is shifted an equal amount to the left. Fluid under pressure from line 54 is then connected to the left end of the motor 18 and the saddle 17 moves to the right. This in turn allows the sleeve 72 to move leftward until the plunger 69 is centered therein to equalize the pressure in the motor 18. Thus the saddle 17 is caused to move a distance equal to the displacement of the tracer valve plunger 58 to compensate for an inaccuracy that might otherwise be produced in the blade contour. A combination of a compensation valve with a tracer valve similar to the briefly described arrangement is shown and described in detail in U.S. Patent 2,727,491, issued December 13, 1955 to Wendall I. Evans.

The tracing valve 47 also functions as a rate control valve by its axial movement. The plunger 58 is rotatably positionable to bring the concave notches 82 and 83 of varying width thereon into overlapping communication with the ports 84 annd 85 respectively. The notches 82 andn 83 are connected by the cannelures 86 and 87 and the interdrilled ports 88, 89 and passage 90. With the plunger 58 in a set angular position in the valve 47, the overlap of the ports 84 and 85 with the notches 82 and 83 can vary as the plunger 58 moves in either direction from its center position illustrated. The smallest restriction in the fluid path will control the flow. Hence as the plunger 58 moves axially in either direction from that position shown, the restriction between the fluid line 91 and the main return line 59 is increased. Since the fluid line 91 is the return line from the fixture motor 16, its rate of rotation will be decreased as the plunger 58 shifts from its center position. Therefore, as the tracing mechanism 23, FIG. 1, causes the table to shift to move the workpieces 8 toward or away from the cutters 21, the rotation of the workpieces 8 is slowed slightly to prevent over-stressing of the cutters 21.

The rotational position of the plunger 58 may be altered to increase and decrease the speed range of operation of the fixture motor 16 by varying the available overlap of the notches 82 and 83 with the ports 84 and 85. Angular adjustment of the plunger 58 is made by the operation of a piston and cylinder motor 92 to which an axially movable rack 93 is attached. The rack 93 engages a pinion 94 which is fixed on a rotatable shaft 95 to which a gear 96 is also fixed. The gear 96 engages a gear 97 which is integrally formed on the end of the valve plunger 58. The piston and cylinder motor 92 is operated between extremes corresponding a fast range and a slow range by means of a solenoid valve 98. The valve 98 connects fluid under pressure from line 54 to line 100 when solenoid 9SOL is energized while at the same time line 101 is connected to the main return line 59. This holds the motor 92 in the condition shown which corresponds to the slow rate range of operation of the fixture motor 16. As can be seen energization of the other solenoid 10SOL will result in the connection of a reverse pressure differential in the motor 92 and the rack 93 will shift to rotate the plunger 58 to the fast range angular position. (The relation of the ports 84 and 85 and the notches 82 and 83 is shown out of its true condition in the drawings for purposes of drawing simplification, it being within the skill of the art to properly align such a valve.)

The fluid operating circuit for each of the piston and cylinder motors 31 and 32 which operate to shift the memory rods 29 and 30, respectively, and the piston and cylinder motors 35 and 36 which operate to extend the stops 33 and 34, respectively, are shown in FIG. 5. Each of the memory rod motors 31 and 32 is connected to a three position, two solenoid valve 102, and 103, respectively by means of fluid lines 104, 105 and 106, 107. The valve 102 is shifted to connect the pressure line 54 with line 104 and the return line 59 to line 105 to effect an extension of the rod 29 to the left when the solenoid 2SOL is energized. Likewise, the valve 103 will connect line 106 to line 54, and line 107 to line 59 to extend the rod 30 to the left when the solenoid 4SOL is energized. Once each of these rods 29 and 30 is shifted to the left (as viewed in FIGS. 1 and 2), the drag on the rods resulting from the packing at the motors 31, 32 will cause the rods to remain extended until forcefully returned. The solenoids 1SOL and 3SOL may be energized at the end of a cycle to cause the valves to reverse the fluid differential in the motors 31 and 32 to return the rods 29 and 30 back to their retracted positions. However, during a machining operation, the rods 29, 30 are pushed back by the stops 33 and 34 when these are extended and the table is moved to the right (as viewed in FIGS. 1 and 2).

The motors 35 and 36 connected to the stops 33 and 34 are operated by a pair of two position, two solenoid valves 108 and 109, each of which has a mechanical detent mechanism 110 and 111 to maintain it in one position or the other. When the solenoid 8SOL is energized to shift the valve to the position shown, pressure and return lines 54 and 59 are connected to fluid lines 112 and 113, respectively, to extend the stop 33. When solenoid 7SOL is energized, the connection of the lines 54 and 59 to the lines 112 and 113 is reversed and the stop 33 is retracted. Through operation of the valve 109, when solenoid 5SOL is energized, pressure line 54 is connected to fluid line 114 and the stop 34 is extended while the energization of solenoid 6SOL results in the retraction of the stop 34 by the connection of the pressure line 54 to line 115.

The hydraulic circuit of FIG. 4 shows a cam operated valve 116 which can connect fluid under pressure from line 54 to the pressure sensitive switch 1PS for operation thereof. A cam 117 is carried by the spindle carrier 19 and when the spindle carrier 19 has extended fully downward over the table 2, the cam 117 shifts the valve 116 and this results in the operation of the pressure switch 1PS that produces a signal defining the end of a cutting cycle and is used in the electrical control circuitry to stop the automatic operation of the machine.

Figure 6:
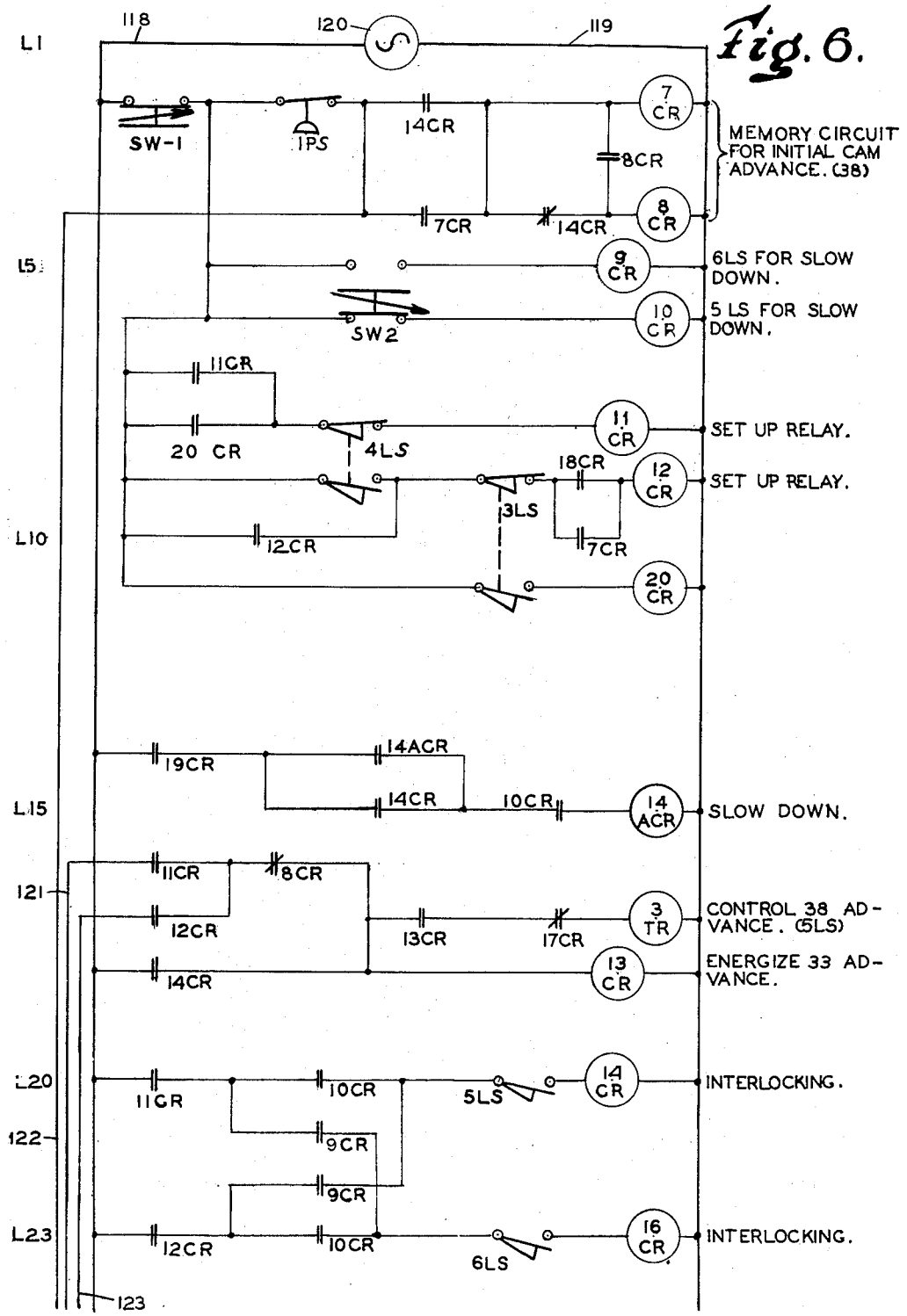

The control of the hydraulic circuit is accomplished electrically by means of the circuit shown in FIGS. 6 and 7, the description of which, with the hydraulic circuits of FIGS. 4 and 5, is best illustrative of the automatic operation of the machine described herein. Reference locations of electrical components in the following description will be given in parentheses by the horizontal reference indicia along the left side of FIGS. 6 and 7 corresponding to the location of identified components. In reproducing a right handed turbine blade as shown in FIG. 3, both the master blade 11 and the workpieces 8 are rotated counter-clockwise by the fixture motor 16. Assume that the initial contact of the tracing roller 22 with the master blade 11 is at its upper end near the convex back contour 27 of the profile (see FIG. 3) when the automatic operation of the machine is begun.

The first rotation of the master blade 11 and the workpieces 8 in unison therewith will provide a set up cycle during which the roller 22 moves over the profile of the master blade 11 but during which the cutters 21 have not been moved downward enough to contact the workpieces, the master blade having a slightly extended length. At the start of the operation, the switch SW1 (L2) is set as shown to condition the circuit for automatic dual speed operation and switch SW2 (L6) is set as shown to condition the circuit to operate with counterclockwise rotation of the master blade 11 and workpieces 8. The relay 10CR (L6) is therefore energized and remains energized throughout the operation, being connected directly across the power lines 118 and 119 extending from the power source 120. At this same time, the relay 19CR (L27) is deenergized and therefore the solenoid 9SOL (L35) is deenergized. As described in regard to FIG. 4, the solenoid 9SOL shifts the valve 98 leftward to connect fluid under pressure to the motor 92 so that the plunger 58 of the tracer valve 47 is rotated to its slow fixture motor speed condition. Thus the rate of rotation of the fixtures 5 and 13 is at the slow speed. At this same time, the stops 33 and 34 are retracted since the solenoids 6SOL (L44) and 7SOL (L37) are energized through contacts of the relays 10CR and 11CR (L37) and 10CR and 12CR (L44), respectively. The memory rods 29 and 30 are also retracted at the start of the described operation the circuit being arranged to clear the information represented by the position thereof at the end of an operation as will be described subsequently.

The first circuit reaction after the start of an operation is the operation of the limit switch 3LS (FIG. 1) by the cam 45 on the rotating portion of the master fixture 13 indicating that the central portion of the convex back portion 27 of the blade form (FIG. 3) is engaged by the tracer roller 22. The contacts of the limit switch 3LS (L11) are closed and the relay 20CR (L11) is energized. Thereafter, the relay 11CR (L8) is energized by the closing of contacts of the relay 20CR (L8). The energizing circuit of the solenoid 7SOL (L37) then is opened and that solenoid is deenergized to condition the valve for shifting by its other solenoid 8SOL. At this same time, the relay 13CR (L18) is energized, a circuit being completed through the contacts of the relays 10CR (L28), 11CR and 8CR (L16) in the conductor 121. Now the solenoid 8SOL (L36) is energized by the closing of a pair of contacts of the relay 13CR (L36) and the valve 108 is shifted to energize the motor 35 to extend the stop 33. The timer 3TR (L17) is energized through the same circuit as the relay 13CR and the contacts thereof in the circuit of the solenoid 2SOL (L39) operate to briefly energize that solenoid. The valve 102 is caused to energize the motor 31 to shift the control rod 29 to the left (as viewed in FIGS. 1, 2 and 5) against the extended stop 33. As the rod 29 is extended, the cam 38 thereon engages and operates the limit switch 5LS. A circuit is thereby completed through contacts of the limit switch 5LS, which close and contacts of the relays 11CR and 10CR (L20) to energize the relay 14CR (L20). Now the relay 7CR (L2) energizes through closed contacts of the relay 14CR (L2) and latches through its own contacts (L4) and pressure opening contacts of the switch 1PS (L4). The fixtures 5 and 13 continue to rotate and the trailing edge 26 of the blade profile is swung around past the tracing roller 22. The rod 29 remains in a position to record the extreme position of the table 2 in the rightward direction (viewed as in FIG. 1) at the instant that the trailing edge 26 passes the roller 22.

After the table 2 has moved a preset distance away from a recorded position, the distance being determined by the location of the cam 38 along the rod 29, the limit switch 5LS is released and then the relay 14CR (L20) is deenergized. The relay 13CR (L18) is then caused to deenergize and consequently the solenoid 8SOL (L36) is also deenergized. The valve 108 does not shift at this time however, since it is held static by the detent mechanism 110. At this same time, the relay 8CR (L4) is energized through the normally closed contacts of the relay 14CR (L4). The relays 7CR and 8CR (L2L4) are memory relays which record the fact of initial setting of the control rod 29 during the described set-up cycle and they prepare the circuit for the subsequent cycles during which the machining of the workpieces 8 takes place.

The set-up cycle continues as the roller 22 is caused to move through the bucket portion 28 of the master blade profile. The limit switch 4LS (FIG. 1) is operated during the time that the roller 22 is in the middle region of the bucket portion 28 causing the relay 11CR (L8) to deenergize. The solenoid 7SOL (L37) is then energized through normally closed contacts of the relay 11CR and contacts of the relay 10CR (L37). This effects retraction of the stop 33 since the valve 108 is now shifted to its other detented position by the solenoid 7SOL. At this same time, the relay 12CR (L9) is energized through a circuit including contacts of the relay 7CR (L10) and of the limit switches 4LS and 3LS (L9), now all closed. The relay 12CR latches energized. The relay 15CR (L26) is also energized by a simultaneous closed condition of contacts of the relays 10CR (L28), 12CR (L25) and 23CR (L24). With the relay 15CR energized, the solenoid 5SOL (L42) is energized and the stop 34 is caused to advance by the shifting of the valve 103 to the right. The timer 4TR (L25) is also energized at this same time through the same circuit as is the relay 15CR plus a parallel leg containing contacts of the relays 15CR and 17CR (L25). With the timer 4TR energized, its contacts (L45) operate for a brief time to energize the solenoid 4SOL which shifts the valve 109 to effect energization of the motor 32 to move the memory rod 30 leftward against the stop 34.

The shift of the rod 30 occurs as the roller 22 is moving out of the bucket portion 28 of the blade profile and the limit switch 6LS is immediately operated by the cam 39 and the contacts of the limit switch 6LS (L32) are closed and relay 16CR (L32) is energized. Now relay 19CR (L27) is energized since the contacts of the relays 16CR and 10CR (L28) in its energizing circuit are closed. Since the relay 19CR is energized, the solenoid 9SOL (L35) is deenergized while solenoid 10SOL (L34) is energized. Thus the valve 98 is condiitoned to effect rotation of the plunger 58 in the tracer valve 47 to its fast range position and the fixture motor 16 is operated at a fast rate. At this same time the relay 18CR (L21) is energized by action of contacts of the relay 16CR (L31) and it latches to record the fact of the initial advance of the cam 39. It is noted that during this set-up cycle, the rate of fixture rotation begins at a slow rate and continues at the slow rate until approximately the center of the bucket portion 28 of the profile is reached. This is the only cycle in which such a rate sequence is employed. In the subsequent machining cycles, the slow rate will prevail only while the central area of the bucket portion 28 is being traced.

The set-up cycle continues with the tracer roller 22 traversing over the leading edge portion 24 of the profile at a fast rate and the convex back 27 is turned toward the roller 22 again. The table 2 is now moving leftward and the rod 30 remains in a position to record the table position at the time that the leading edge 24 was passed. When the table 2 has been moved the preset distance back from the recorded position, the limit switch 6LS is released by the cam 39 and the relay 16CR (L23) is deenergized. The relay 23CR (L32) is now energized by a circuit including normally closed contacts of the relay 16CR and contacts of the relay 18CR (L32). With the relay 16CR deenergized and the relay 23CR energized, the timer 4TR (L25) and the relay 15CR (L26) are deenergized. The solenoid 5SOL (L42) is then also deenergized.

The fixtures 5 and 13 have now moved approximately a full revolution and the roller 22 is in contact with the center area of its convex back 27. All of the succeeding cycles now will be the same but will differ from the described set-up cycle which has initially positioned the control rods 29 and 30. Concurrently with the set-up cycle, the cutters 21 have been moving downward toward the workpieces 8 and will machine the workpieces 8 during these succeeding automatic cycles in which the dual speed operation will be controlled in accordance with the data recorded cycle to cycle by the rods 29 and 30 to prevent excessive cutting forces.

With the center area of the convex back 27 turned toward the roller 22, the limit switch 3LS is again operated and the relay 20CR (L11) is energized. The relay 11CR (L8) is then immediately energized and the solenoid 7SOL (L37) is deenergized as a result. When the limit switch 3LS is operated, the relay 12CR (L9) is also caused to deenergize and this in turn energizes the solenoid 6SOL (L4). The valve 109 is then shifted to effect a retraction of the stop 34. The fixtures 5 and 13 continue to rotate at the fast rate and the table 2 is moving back toward the right as the trailing edge 26 swings toward the roller 22. When the table reaches a point that is the preset distance from the previously recorded trailing edge position, the limit switch 5LS is carried into engagement with the cam 38 and is operated. As a result, the relay 14CR (L20) is energized through a circuit including contacts of the relays 11CR, 10CR, and the limit switch 5LS (L20). Since the relay 19CR (L27), the fast rate relay, is still energized, the relay 14ACR (L15) is energized through contacts of the relays 19CR (L14) and 14CR (L15) to prepare the circuit for a subsequent fixture motor rate slowdown by opening one parallel latch circuit of the relay 19CR which includes contacts of the relay 14ACR (L30). At the same time that the relay 14CR is energized, the relay 13CR (L18) and the timer 3TR (L17) are energized sequentially with a closing of the contacts of the relay 14CR (L18) in their circuits. Therefore, the solenoid 8SOL (L36) is energized and the valve 108 is caused to shift to connect fluid under pressure to the motor 35 to extend the stop 33. Also, the solenoid 2SOL (L39) is energized briefly to operate the valve 102 to cause the motor 31 to extend the rod 29 against the stop 33 and to clear the information represented by that rod's position.

The rotation of the fixtures 5 and 13 continues and the rod 29 will be carried back to the right therewith to allow the trailing edge 26 to swing past the tracer roller 22 at which point the table 2 reverses direction and leaves the rod 29 to record a new position. After the preset movement of the table 2 leftward away from the trailing edge extremity, the limit switch 5LS is carried off of the cam 38 and the relay 14CR (L20) is deenergized. The relay 13CR (L18) is then deenergized along with the timer 3TR (L17). The solenoid 8SOL (L36) is then immediately deenergized but the valve 108 remains detented in its stop advance position. At this same time, the remaining latch circuit to the relay 19CR (L27), through contacts of the relay 14CR (L29), 16ACR (L30) and the conductor 122 is opened and relay 19CR is deenergized. Consequently, the solenoid 10SOL (L34) is also deenergized while the solenoid 9SOL (L35) is energized. Thus the rate control valve 98 is shifted to produce a slow rate of rotation of the motor 16. The cutters 21 are now in the section of the blade profile which wraps around those tools and tends to cause the increased machining forces. The rate of traverse or feed speed is now reduced and thus compensation is made to reduce the adverse effect of the increased arc of contact between the blades 8 and the cutters 21 at this time.

The machining process is now occurring in the blade buckets and when the roller 22 reaches the central portion thereof, the limit switch 4LS is operated by the cam 45 on the fixture 13 and this causes the relay 11CR (L8) to be deenergized. The solenoid 7SOL (L37) is now energized as a result and the valve 108 is shifted to produce a retraction of the stop 33. At this same time, the relay 12CR (L9) is energized and latched. Now, the next cyclic occurrence is the operation of the limit switch 6LS by the cam 39 on the memory rod 30 which has been positioned in accordance with the previous extreme in table movement to swing the leading edge 24 past the roller 22. The operation of the limit switch 6LS occurs when the table 2 is a preset distance away from the table travel extreme represented by the rod's position. While this recorded position may not correspond to the actual table position when the leading edge 24 will pass the roller, it approximates that position. The error is only the difference between the distances from the center of rotation of the master blade to the point of roller contact on the leading edge for the preceding cycle and for the instant cycle. Since the roller 22 progresses downward along the blade slowly from cycle to cycle and since the change in chordal length is gradual, this difference is very small and of no practical significance. Moreover, this error does not accumulate from cycle to cycle and does not get larger for each succeeding cycle. With the operation of the limit switch 6LS, the relay 16CR (L23) is energized again and the relay 19CR (L27) is energized through contacts of the relays 10CR and 16CR (L27). Thus the solenoid 9SOL (L35) is deenergized while the solenoid 10SOL (L34) is energized. The valve 98 is again shifted to cause the fixture motor 16 to be put in its fast rate range of operation. At this same time, the relay 15CR (L26) and the timer 4TR (L25) are energized in sequence as in the set-up cycle to energize the solenoids 5SOL (L42) and 4SOL (L45), respectively, and the stop 34 is extended and then engaged by the memory rod 30 for resetting in accordance with the next table extreme or point of reversal.

The fixtures 5 and 13 now rotate at the fast rate and the rod 30 is left in a new position as the leading edge 24 is swung past the roller 22. Again when the table 2 has moved back leftward from the newly recorded position the preset amount, the limit switch 6LS is released. Immediately thereafter, the relay 16CR (L23) is deenergized and both the relay 15CR (L26) and the timer 4TR (L25) are then caused to be deenergized. The solenoid 5SOL (L42) is also deenergized now. The machining operation continues and the next occurrence is the operation of the limit switch 3LS by the cam 45 whereupon the described automatic control cycle is repeated. The cycle continues to be repeated until the spindle carrier 19 (FIG. 1) is extended fully downward at which time the cam 117 shifts the valve 116 to connect pressure to the pressure sensitive switch 1PS. The contacts of the switch 1PS (L33) close to energize the relay 17CR (L33) which in turn has contacts (L41, L47) that close to energize the solenoids 1SOL and 3SOL (L41, L47). This effects a shift of the valves 102 and 103 to the left which then causes the fluid motors 31 and 32 to retract the control rods 29 and 30. The initial dog advance circuit containing relays 7CR and 8CR (L2, L4) is also cleared by the opening of the contacts of the switch 1PS (L2) therein to prepare the control circuit for another machining operation. The switch 1PS also furnishes an electrical signal which initiates the retraction of the spindle carrier 19 and the deenergization of the hydraulic circuits thereafter through additional control circuitry (not shown) the design of which is within the recognized skill of the machine tool art.

While the invention has been described in connection with one possible form or embodiment thereof, it is to be understood that the present disclosure is illustrative rather than restrictive and that changes and modifications may be resorted to without departing from the spirit of the invention or the scope of the claims which follow.

What is claimed is:

1. In a machine tool having one member movable through a series of repeated cyclic motions and another member coincidentally movable through repeated cyclic reciprocal motions varying cycle to cycle, a control mechanism for altering the rate of movement of said one member comprising in combination:

(a) a recording element, (b) selectively energizable means to connect said recording element to said other member for movement therewith in one direction only, said recording element being left in a position to record an extreme position of movement of said other member upon movement of said other member in the other direction after movement in said one direction, (c) signal producing means attached to said other member and adapted to engage said recording element to produce a rate control signal when said other member is a preset distance away from a recorded position, and
(d) means to alter the rate of movement of said one member in response to said rate control signal.

2. The mechanism of claim 1 wherein:
(a) said recording element includes a cam positionable thereon,
(b) said signal producing means is operated by said cam, the position of said cam on said recording element in the other direction to reset said recording position at which said rate control signal is produced, and
(c) means are included to move said recording element in the other direction to rest said recording element for recording a new extreme position of said other member when it is next moved in said one direction.

3. In a machine tool having one member movable through a series of cyclic motions and another member movable through predetermined variable reciprocal motions coincidental with the cycles of said one member, a control mechanism for altering the rate of movement of said one member comprising in combination:
(a) a plurality of recording means, each of said recording means including a record member positionable in response to selected movement of said other member to record a position of said other member at a predetermined point in the cycle of said one member, each of said recording means being automatically resettable to record a position during each of the cycles of said one member,
(b) a plurality of signal producing means, each of said signal producing means adapted for actuation by a respective one of said recording means to produce a rate control signal when said other member is a preset distance away from a recorded position represented by the position of the record member of the respective recording means, and
(c) means to alter the rate of movement of said one member in response to the rate control signals from said signal producing means.

4. The mechanism of claim 3 wherein:
(a) each of said plurality of recording means includes a cam positionable in response to movement of said other member to an extreme position thereof,
(b) each of said plurality of signal producing means is a limit switch fixed on said other member and adapted for operation by one of said cams when said other member is a preset distance from a recorded position, and
(c) means are included to shift said cams and clear the information represented by their positions during each cycle of said one member and thereby to reset said cams to record new positions of said other member.

5. The mechanism of claim 4 wherein each of said recording means also includes:
(a) a plurality of plungers attached to said other member, each of said plungers being extendable therefrom for movement of one of said cams to a position corresponding to an extreme position of said other member, and
(b) means to control the extension of said plungers in response to movement of said one member through a predetermined position in each cycle thereof.

6. In a milling machine adapted to produce a twisted turbine blade shape having a leading and a trailing edge, the machine having a rotable fixture, an unfinished blade in said fixture, a reciprocally movable table supporting said fixture, and a cutting tool movable along the axis of rotation of said fixture as said fixture is rotated and said table is reciprocated to move said cutting tool over the surface of said blade in a machining operation, a mechanism for controlling the rate of rotation of said fixture comprising in combination:

(a) means including a pair of movable members each shiftable in response to selected movement of said table to a position corresponding to the position of said table when said cutting tool is at the leading and the trailing edge of said blade during each revolution of said fixture, said recording means being automatically resettable during each succeeding revolution of said fixture,
(b) means actuated by said recording means to produce rate control signals each time said table is moved to a position that is a preset distance away from one of the recorded positions, and
(c) means to alter the rate of rotation of said fixture in response to said rate control signals whereby the rate of movement of said cutting tool relative to said blade can be increased and decreased in accordance with the shape being produced thereon.

7. The mechanism of claim 6 wherein said recording means includes:
(a) a pair of movable cams,
(b) means selectively to move each of said cams in accordance with movement of said table only when said table is moved in one direction to relatively move said cutting tool to one of said blade edges, each of said cams remaining in a position corresponding the position of said table when said cutting tool is at an edge of the blade, and
(c) means selectively to move each of said cams in the opposite direction to clear the information represented by the position thereof and to prepare each of said cams for resetting in a succeeding revolution of said fixture.

8. The mechanism of claim 7 wherein:
(a) the means to move said cams includes a pair of plungers attached to said table, each of said plungers being extendable therefrom for movement of one of said cams with the table in said one direction, and
(b) means are included to control the extension of said plungers in accordance with the rotation of said fixture whereby one of said plungers is extended when the cutting tool moves relatively toward the leading edge of a blade and the other of said plungers is extended when said cutting tool moves relatively toward the trailing edge of a blade.

9. The mechanism of claim 8 wherein:
(a) said means producing rate control signals is a pair of limit switches fixed to said table, each of said limit switches being adapted to engage one of said cams for operation thereby when said table is a preset distance from the position recorded by the respective cam.

10. The mechanism of claim 9 wherein:
(a) said means to move each of said cams in the opposite direction is a pair of piston and cylinder motors each having a piston rod extending therefrom,
(b) each of said plungers is adapted to engage an end of one of said piston rods, for movement thereof in said one direction,
(c) each of said cams is adjustably fixed on one of said piston rods, said cams being adjustable on said piston rods to preset the distances from recorded positions at which said limit switches are operated, and
(d) means responsive to rotation of said fixture are included selectively to control the piston and cylinder motors to move said cams in said opposite direction prior to relative movement of said cutting tool to one of said blade edges.

11. A mechanism for recording points of reversal of a member reciprocally movable through varying strokes and producing a signal when said movable member is a preset distance from a point of reversal, the combination comprising:

(a) a piston and cylinder motor having a rod extending therefrom and adapted to engage said movable member for movement thereby in one direction only, (b) a cam adjustably positionable along said rod, (c) means momentarily to energize said piston and cylinder motor to move said rod in the other direction to contact said movable member during movement thereof in said one direction until the movable member is reversed and moved in the other direction, and (d) signal means on said movable member adapted to engage said cam for operation thereby when said movable member is a preset distance from a point of reversal of said movable member recorded by the position of said rod, the preset distance dependent upon the position of said cam on said rod.

12. A mechanism for recording a plurality of points of reversal of a member reciprocally movable through varying strokes and producing a signal when said movable member is a preset distance from a selected point of reversal, the combination comprising:

(a) a plurality of plungers fixed to and extendable from said movable member, (b) a plurality of piston and cylinder motors each having a rod extending therefrom and adapted to engage one of said plungers when extended for movement thereby in one direction only, (c) a plurality of cams, one of said cams received on each of said rods and adjustably positionable therealong, (d) means selectively to extend each of said plungers during movement of the movable member in said one direction, (e) means selectively and momentarily to energize each of said piston and cylinder motors to move the one of said rods extending therefrom in the other direction to contact one of said plungers, each of said plungers operable thereafter to move the rod engaged thereby in said one direction until the movable member is reversed and moved in the other direction, and (f) a plurality of signal means on said movable member, each of said signal means adapted to engage one of said cams for operation thereby when said movable member is a preset distance from a point of reversal of said movable member recorded by the respective rod, the preset distances dependent upon the position of said cams on said respective rods.

References Cited in the file of this patent
UNITED STATES PATENTS

| | | |
|---|---|---|
| 2,473,741 | Wilder et al. | June 21, 1949 |
| 2,535,896 | Buckles et al. | Dec. 26, 1950 |
| 2,644,370 | Armitage | July 7, 1953 |